(12) United States Patent
Weng et al.

(10) Patent No.: US 9,508,349 B2
(45) Date of Patent: Nov. 29, 2016

(54) METHOD, SYSTEM, AND TERMINAL DEVICE FOR TRANSMITTING INFORMATION

(71) Applicant: TENCENT TECHNOLOGY (SHENZHEN) COMPANY LIMITED, Shenzhen (CN)

(72) Inventors: Yuedong Weng, Shenzhen (CN); Pengfei Huang, Shenzhen (CN); Sheng Chen, Shenzhen (CN); Chunhua Luo, Shenzhen (CN); Zhiqiang He, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 8 days.

(21) Appl. No.: 14/615,831

(22) Filed: Feb. 6, 2015

(65) Prior Publication Data

US 2015/0154963 A1 Jun. 4, 2015

Related U.S. Application Data

(63) Continuation of application No. PCT/CN2014/077779, filed on May 19, 2014.

(30) Foreign Application Priority Data

Jun. 6, 2013 (CN) .......................... 2013 1 0222406

(51) Int. Cl.
*G10L 19/00* (2013.01)
*G10L 19/002* (2013.01)
(Continued)

(52) U.S. Cl.
CPC ............. *G10L 19/002* (2013.01); *G10L 15/06* (2013.01); *G10L 19/24* (2013.01)

(58) Field of Classification Search
CPC ............. G10L 15/06; G10L 2015/088; H04L 1/0045; H04L 1/005; H04L 1/0059; H04L 1/0065; H04L 1/0071; H04L 25/0224; H04L 27/261; H04L 12/40117; H04L 12/4035; H04L 1/206; H04L 7/033; G06F 11/1625; G06F 17/30017; H03M 13/09; H03M 13/1108; H03M 13/1111; H03M 13/1515; H03M 13/23; H03M 13/255; H03M 13/2948; H03M 13/373; H03M 7/30; H04N 21/2368; H04N 21/4341; G11B 2020/10546; H04H 20/95; H04M 7/0072; H04W 72/042
USPC .............. 704/201, 200.1, 500–504; 379/329, 379/280, 336, 330; 375/267, 260
See application file for complete search history.

(56) References Cited

U.S. PATENT DOCUMENTS 6,081,783 A * 6/2000 Divine .................... H03M 7/30
704/201
6,111,896 A * 8/2000 Slattery ............ H04N 21/23608
370/516

(Continued)

FOREIGN PATENT DOCUMENTS

| CN | 201063795 Y | 5/2008 |
|----|-------------|--------|
| CN | 101662378 A | 3/2010 |
| CN | 102682772 A | 9/2012 |

OTHER PUBLICATIONS

Machine Translation of applicant provided document CN101662378 A.*

(Continued)

*Primary Examiner* — Vijay B Chawan
(74) *Attorney, Agent, or Firm* — Anova Law Group, PLLC

(57) ABSTRACT

Methods, systems, and terminal devices for transmitting information are provided. An exemplary system includes a sending end and at least one receiving end. The sending end is configured to obtain audio data to be transmitted, encode the obtained audio data according to an M-bit unit length, and use a pre-set cross-platform audio interface to control an audio outputting device of the sending end to send the encoded audio data to the at least one receiving end. The M-bit unit length is an encoding length corresponding to each frequency of a number N of frequencies, N is greater than or equal to 2, and M is greater than 0. The at least one receiving end is configured to use the pre-set cross-platform audio interface to control an audio inputting device of the at least one receiving end to receive the encoded audio data.

20 Claims, 5 Drawing Sheets

(51) Int. Cl.
*G10L 15/06* (2013.01)
*G10L 19/24* (2013.01)

(56) References Cited

U.S. PATENT DOCUMENTS

| | | | | | |
|---|---|---|---|---|---|
| 6,141,345 | A | * | 10/2000 | Goeddel | H04J 3/1682 370/352 |
| 6,243,372 | B1 | * | 6/2001 | Petch | H04J 3/0682 370/324 |
| 6,243,676 | B1 | * | 6/2001 | Witteman | G06F 17/30017 704/243 |
| 9,191,256 | B2 | * | 11/2015 | Vojcic | H04L 1/005 |
| 2001/0010711 | A1 | * | 8/2001 | Dijkmans | H04H 20/46 375/295 |
| 2004/0080671 | A1 | * | 4/2004 | Siemens | H04L 1/203 348/473 |
| 2008/0233966 | A1 | * | 9/2008 | Scheim | H04L 5/0023 455/452.1 |
| 2013/0322461 | A1 | * | 12/2013 | Poulsen | H04J 3/02 370/458 |
| 2013/0322462 | A1 | * | 12/2013 | Poulsen | H04J 3/06 370/458 |
| 2014/0153625 | A1 | * | 6/2014 | Vojcic | H04L 1/005 375/224 |
| 2014/0153628 | A1 | * | 6/2014 | Vojcic | H04L 1/005 375/227 |

OTHER PUBLICATIONS

The World Intellectual Property Organization (WIPO) International Search Report for PCT/CN2014/077779 May 19, 2014.

* cited by examiner

METHOD, SYSTEM, AND TERMINAL DEVICE FOR TRANSMITTING INFORMATION

CROSS-REFERENCES TO RELATED APPLICATIONS

This application is a continuation application of PCT Patent Application No. PCT/CN2014/077779, filed on May 19, 2014, which claims priority to Chinese Patent Application No. CN201310222406X, filed on Jun. 6, 2013, the entire contents of which are incorporated herein by reference.

FIELD OF THE DISCLOSURE

The present disclosure relates to the field of communication technology and, more particularly, relates to methods, systems, and terminal devices for transmitting information.

BACKGROUND

Currently, wireless communication technology uses electromagnetic fields emitted from a terminal device to transmit information. This has higher hardware requirements for the terminal device.

For example, Bluetooth wireless transmission can be used and requires both a sending end and a receiving end to be equipped with Bluetooth communication modules. Information can then be transmitted, after a successful pairing of the communication parties.

For WIFI wireless transmission, the sending end and the receiving end are also required to be equipped with WIFI communication modules. The communication parties have to be successfully paired before information can be transmitted.

BRIEF SUMMARY OF THE DISCLOSURE

One aspect of the present disclosure includes an information transmitting method implemented by a system including a sending end and at least one receiving end. The sending end obtains audio data to be transmitted, encodes the obtained audio data according to an M-bit unit length and uses a pre-set cross-platform audio interface to control an audio outputting device of the sending end to send the encoded audio data to the at least one receiving end. The M-bit unit length is an encoding length corresponding to each frequency of a number N of frequencies, N is greater than or equal to 2, and M is greater than 0. The at least one receiving end uses the pre-set cross-platform audio interface to control an audio inputting device of the at least one receiving end to receive the encoded audio data.

Another aspect of the present disclosure includes an information transmitting method implemented by a sending end containing an audio outputting device by obtaining audio data to be transmitted, encoding the obtained audio data according to an M-bit unit length, and using a pre-set cross-platform audio interface to control the audio outputting device of the sending end to send the encoded audio data to at least one receiving end, such that the at least one receiving end uses the pre-set cross-platform audio interface to control the audio inputting device at the at least one receiving end to receive the encoded audio data. The M-bit unit length is an encoding length corresponding to each frequency of a number N of frequencies, N is greater than or equal to 2, and M is greater than 0.

Another aspect of the present disclosure includes an information transmitting method, implemented by a receiving end containing an audio inputting device. A pre-set cross-platform audio interface is used to control the audio inputting device of the receiving end to receive encoded audio data sent from an audio outputting device of a sending end by a processing including: using the pre-set cross-platform audio interface to create a new thread, using the new thread to control the audio inputting device of the receiving end to receive the encoded audio data, wherein the encoded audio data include audio data having appended tags at a start position and an end position of the audio data, converting the received audio data into an audio signal via fast Fourier transform, restoring the audio signal to a digital signal according to a digital frequency encoding table, and using the third-party library to decode the digital signal and to obtain audio data to be transmitted.

Another aspect of the present disclosure includes an information transmitting system. The system include a sending end and at least one receiving end, the sending end containing an audio outputting device and the at least one receiving end containing an audio inputting device. The sending end is configured to obtain audio data to be transmitted, to encode the obtained audio data according to an M-bit unit length, and to use a pre-set cross-platform audio interface to control the audio outputting device to send the encoded audio data to the at least one receiving end. The M-bit unit length is an encoding length corresponding to each frequency of a number N of frequencies, N is greater than or equal to 2, and M is greater than 0. The at least one receiving end is configured to use the pre-set cross-platform audio interface to control the audio inputting device of the at least one receiving end to receive the encoded audio data.

Another aspect of the present disclosure includes a terminal device containing an audio outputting device. The terminal device includes a data obtaining unit, a data encoding unit, and a data sending unit. The data obtaining unit is configured to obtain audio data to be transmitted. The data encoding unit is configured to encode the obtained audio data according to an M-bit unit length. The M-bit unit length is an encoding length corresponding to each frequency of a number N of frequencies, N is greater than or equal to 2, and M is greater than 0. The data sending unit is configured to use a pre-set cross-platform audio interface to control the audio outputting device of the sending end to send the encoded audio data to at least one receiving end, such that the at least one receiving end uses the pre-set cross-platform audio interface to control the audio inputting device at the at least one receiving end to receive the encoded audio data.

Another aspect of the present disclosure includes a terminal device containing an audio inputting device. The terminal device includes a data receiving unit configured to use a pre-set cross-platform audio interface to control the audio inputting device of the receiving end to receive encoded audio data sent from the audio outputting device of the sending end.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Figure 1:
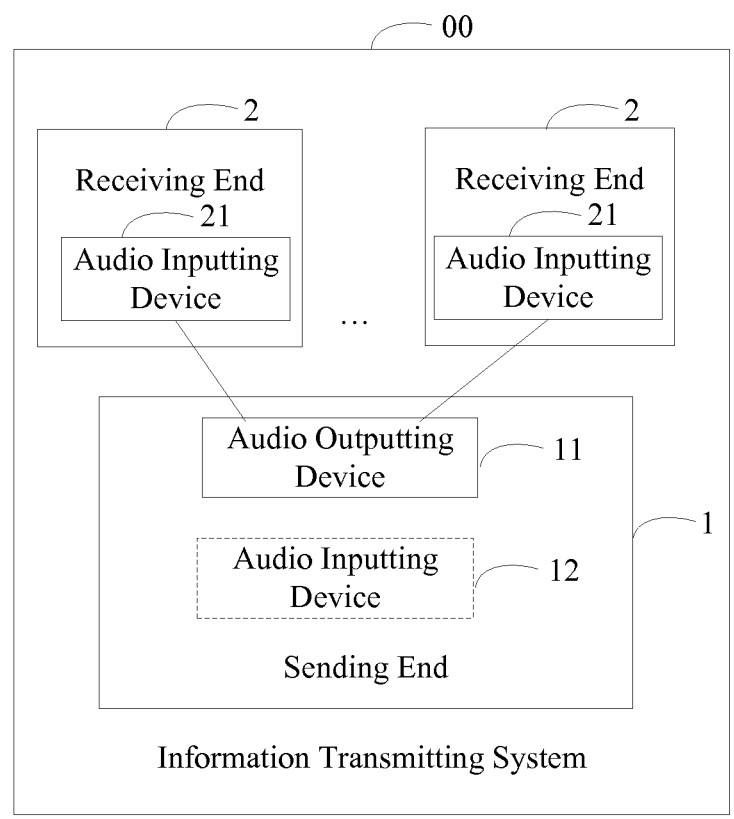
FIG. 1 is a network architecture illustrating an exemplary system for transmitting information in accordance with various disclosed embodiments.

FIG. 1 shows an exemplary information transmitting system 00. The exemplary information transmitting system 00 can at least include a sending end 1 and at least one receiving end 2. The sending end 1 is communicated with the at least one receiving end 2 via an acoustic communication connection.

The sending end 1 can be any terminal device containing an audio outputting device 11. The at least one receiving end 2 can be any terminal device containing an audio inputting device 21. The terminal device can include, but be not limited to, a mobile phone, tablet computer, and laptop. The audio inputting device can include, but be not limited to, a microphone. The audio outputting device can include, but be not limited to, a speaker.

In various embodiments, the sending end obtains audio data to be transmitted, encodes the obtained audio data according to an M-bit unit length, uses the pre-set cross-platform audio interface to control the audio outputting device 11 to send the encoded audio data to the at least one receiving end 2. The M-bit unit length can be a encode length corresponding to each frequency of selected number N of frequencies, where N is greater than or equal to 2, and M is greater than 0. The at least one receiving end 2 uses the pre-set cross-platform audio interface to control the audio inputting device 21 of the receiving end to receive the encoded audio data. The obtained audio data to be transmitted can be audio data pre-stored by the sending end 1 or audio data collected by the audio inputting device 12 of the sending end 1. The obtained audio data to be transmitted can further be audio data converted from text messages. The text messages can include text message inputted by the user or text message pre-stored by the sending end 1.

In some embodiments, the sending end 1 encoding the obtained audio data according to the M-bit unit length may include: selecting the number N of frequencies in the transmittable audio frequency domain. Each frequency of the number N of frequencies corresponds to an M-bit encode. N is greater than or equal to 2, for example, N is 31. M is greater than 0, for example, M is 5. A different tag can be appended respectively at a start position and an end position of the obtained audio data. The different tag includes a encode corresponding to any frequency of the number N of frequencies.

The third-party library can be used to perform an error correction to the audio data having the appended tags. The audio data after the error correction can be encoded according to the M-bit unit length. The third-party library can be a soloman library.

Because of the introduction of the third-party library, when the audio data is interfered by environmental noises, the audio data can be performed by error correction to remove the noises and to ensure that the audio data can be accurately and inerrably sent to the receiving end and.

The sending end 1 controls the audio outputting device 11 of the sending end 1 and sends the encoded audio data to at least one receiving end 2 via the pre-set cross-platform audio interface. This process can include: the sending end 1 obtains information of the at least one receiving end 2 via the pre-set cross-platform audio interface, the information including, but not limited to, audio sampling information, number of channels, bits per channel, cache size of audio data, and/or buffer size of audio data of the receiving end 2. The audio outputting device 11 of the sending end 1 can be used to send current, encoded audio data to the at least one receiving end 2, according to the obtained information of the receiving end 1. For example, each time the M-bit unit length audio data can be sent.

After finishing sending the current, encoded audio data, the callback function of the cross-platform audio interface can be used to detect whether new, encoded audio data exist. When detecting that the new, encoded audio data exist, the audio outputting device 11 of the sending end 1 can be continuously used to send the new, encoded audio data. When detecting that the new, encoded audio data do not exist, the new, encoded audio data is stopped to be sent.

In addition, the controlling of the audio inputting device 21 of the receiving end 2 to receive the encoded audio data via the pre-set cross-platform audio interface by the at least one receiving end 2 includes: using the pre-set cross-platform audio interface to create the new thread by the at least one receiving end 2; using the new thread to control the audio inputting device 21 of the receiving end to receive the encoded audio data, wherein the encoded audio data include the audio data having the appended tags at the start position and the end position; converting the received audio data into an audio signal via fast Fourier transform; restoring the audio signal to a digital signal according to a digital frequency encoding table; and/or using the third-party library (e.g. the soloman library) to decode the digital signal and to obtain the audio data to be transmitted. The audio data to be transmitted is the firstly obtained audio data to be transmitted by the sending end.

As disclosed, a cross-platform audio interface can be configured and can be used to block/remove differences among information transmitting platforms of various terminal devices. Unitive standards can be used to realize information transmitting between different terminal devices.

In an exemplary scenario, the sending end includes a microphone and a speaker, while the receiving end includes the microphone and the speaker. The sending end records the user voice information via the microphone, while the sending end encodes the voice information using the above-mentioned coding scheme, and performs the error correction using the soloman library during the encoding process. The sending end controls the speaker of the sending end to send the encoded voice information via the cross-platform audio interface to multiple receiving ends. The multiple receiving ends control the microphones of the receiving ends to record the voice information via the cross-platform audio interface. The multiple receiving ends decode the voice information using the above-mentioned coding scheme, and perform the error correction using the soloman library during the encoding process again. The multi receiving ends broadcast the decoded voice information via the speakers.

Note that the above exemplary scenario only provides one example for explanation and is not used to limit the scope of the present disclosure. For convenience of description, the system of FIG. 1, only the sending side and the receiving side are described, other components and elements can be included as desired. It should be clear to skilled person in the art, the system configuration including a sending end and the receiving end does not limit the scope of the exemplary system in FIG. 1. The sending end and the receiving end illustrated may include more or less components, or a combination of some of the components, or a different arrangement of components. For example, the sending end and the receiving end may include audio inputting devices and audio outputting devices.

Figure 2:
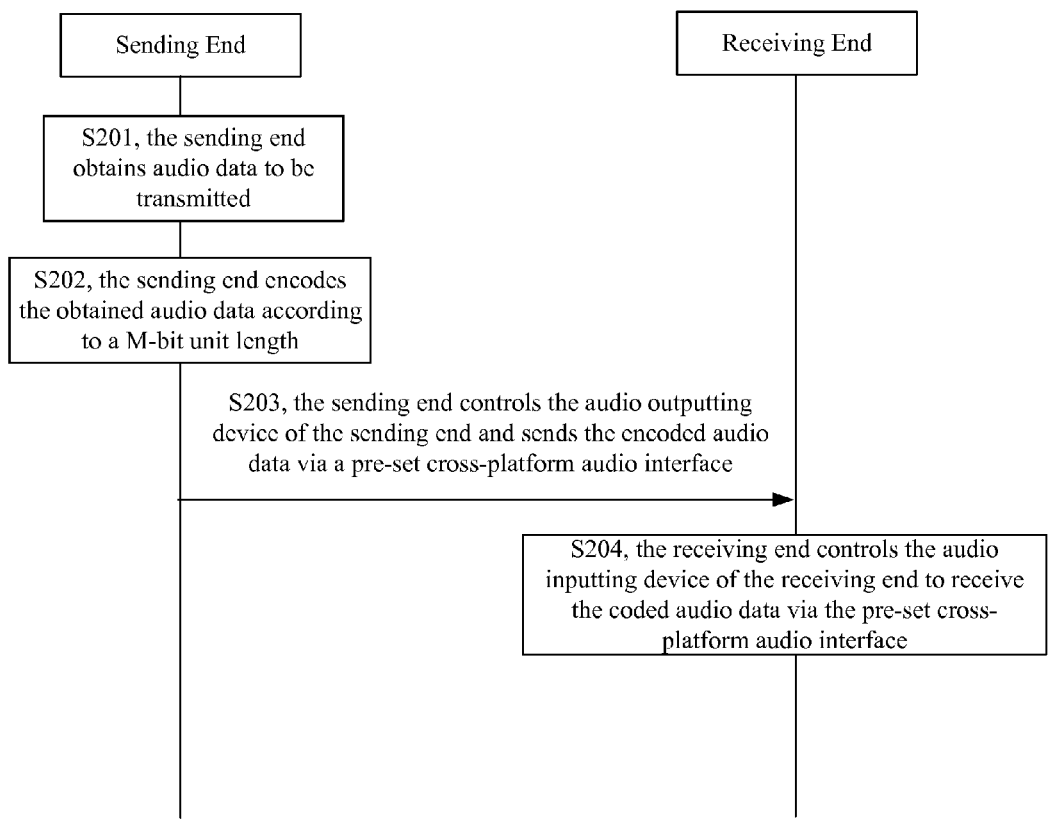
FIG. 2 is a schematic illustrating an interactive process for an exemplary method for transmitting information in accordance with various disclosed embodiments.

FIG. 2 depicts another exemplary method for information transmitting.

In Step S201, a sending end obtains audio data to be transmitted. In various embodiments, the obtained audio data to be transmitted can be audio data pre-stored by the sending end or audio data collected by the audio inputting device of the sending end, and can further be audio data converted from the text messages. The text messages can be text message inputted by the user or pre-stored by the sending end. The audio inputting device includes, but is not limited to, microphone. The audio data can include voice information inputted by the user via microphone or other audio inputting devices.

In Step S202, the sending end encodes the obtained audio data according to the M-bit unit length. The M-bit unit length is an encoding length corresponding to each frequency of a number N of frequencies, N is greater than or equal to 2, and M is greater than 0.

For example, the number N of frequencies can be selected in the transmittable audio frequency domain. Each frequency of the number N of frequencies corresponds to an M-bit encode. N is greater than or equal to 2, for example, N is 31. M is greater than 0, for example, M is 5. A different tag can be appended respectively at a start position and an end position of the obtained audio data. The different tag includes a encode corresponding to any frequency of the number N of frequencies.

The third-party library can be used to perform an error correction to the audio data having the appended tags. The audio data after the error correction can be encoded according to the M-bit unit length. The third-party library can be a soloman library.

Because of the introduction of the third-party library, when the audio data is interfered by environmental noises, the audio data can be performed by error correction to remove the noises and to ensure that the audio data can be accurately and inerrably sent to the receiving end and.

In Step S203, the sending end controls the audio outputting device of the sending end and sends the encoded audio data to at least one receiving end via the pre-set cross-platform audio interface.

In one embodiment, that the sending end controls the audio outputting device of the sending end and sends the encoded audio data to at least one receiving end via the pre-set cross-platform audio interface includes: the sending end obtains information of the at least one receiving end via the pre-set cross-platform audio interface. The information includes, but is not limited to, audio sampling information, number of channels, bits per channel, cache size of audio data, and/or buffer size of audio data of the receiving end.

The audio outputting device of the sending end can be used to send current, encoded audio data to the at least one receiving end, according to the obtained information of the receiving end. For example, each time, the M-bit unit length audio data can be sent.

After finishing sending the current, encoded audio data, the callback function of the cross-platform audio interface can be used to detect whether new, encoded audio data exist. When detecting that the new, encoded audio data exist, the audio outputting device 11 of the sending end 1 can be continuously used to send the new, encoded audio data. When detecting that the new, encoded audio data do not exist, the new, encoded audio data is stopped to be sent.

In Step S204, the at least one receiving end controls the audio inputting device of the receiving end to receive the encoded audio data via the pre-set cross-platform audio interface.

For example, that the at least one receiving end controls the audio inputting device of the receiving end to receive the encoded audio data via the pre-set cross-platform audio interface, includes: using the pre-set cross-platform audio interface to create the new thread by the at least one receiving end; using the new thread to control the audio inputting device of the receiving end to receive the encoded audio data, the encoded audio data including the audio data having the appended tags at the start position and the end position; converting the received audio data into an audio signal via fast Fourier transform; restoring the audio signal to a digital signal according to a digital frequency encoding table; and/or using the third-party library (e.g. a soloman library) to decode the digital signal and to obtain the audio data to be transmitted.

As disclosed, a cross-platform audio interface can be configured and can be used to block/remove differences among information transmitting platforms of various terminal devices. Unitive standards can be used to realize information transmitting between different terminal devices.

In one embodiment, a cross-platform audio interface as designed and the outcome of the design can be shown as following.

```
#ifndef __UFO_PLATFORM_AUDIO__
#define __UFO_PLATFORM_AUDIO__
typedef struct tagAudioDesc//### description of creating audio device
{
int sampleRate;//### sampling rate of audio data
int channels;//### number of channels
int bitsPerChannel;//### bits per channel
int bufferSize;//### buffer size of audio data
int bufferCount;//### buffer count of audio data
}AudioDesc;
typedef struct tagAudioBufferDesc//### description of buffer block of audio data
{
int capacity;//###
int dataSize;//###
void *data;//###
}AudioBufferDesc;
typedef struct __OUTPUT_AUDIO//### output audio handle
{
int unused;
}*OUTPUT_AUDIO;
typedef struct __INPUT_AUDIO//### input audio handle
{
int unused;
}*INPUT_AUDIO;
```

-continued

```
//### callback function of audio playback/output
typedef void (*AUDIO_OUTPUT_CALLBACK)(OUTPUT_AUDIO handle,
AudioBufferDesc *buffer, void* userdata);//### buffer play Finish, callback
//### callback function of audio input
typedef void (*AUDIO_INPUT_CALLBACK)(INPUT_AUDIO handle,
AudioBufferDesc *buffer, void* userdata);//### buffer record Finish, callback
//### create output audio device
OUTPUT_AUDIO ufoAudioOutputCreate(AudioDesc *desc,
AUDIO_OUTPUT_CALLBACK callback, void *userdata);
//### play audio
int ufoAudioOutputPlay(OUTPUT_AUDIO handle);
//### stop outputting audio
int ufoAudioOutputStop(OUTPUT_AUDIO handle);
//### create input audio device
INPUT_AUDIO ufoAudioInputCreate(AudioDesc *desc,
AUDIO_INPUT_CALLBACK callback, void *userdata);
//### input audio
int ufoAudioInputStart(INPUT_AUDIO handle);
//### stop inputting audio
int ufoAudioInputStop(INPUT_AUDIO handle);
#endif
```

As disclosed, the communication parties can achieve a low-cost, cross-platform, and/or cross-terminal near-field wireless communication.

Figure 3:
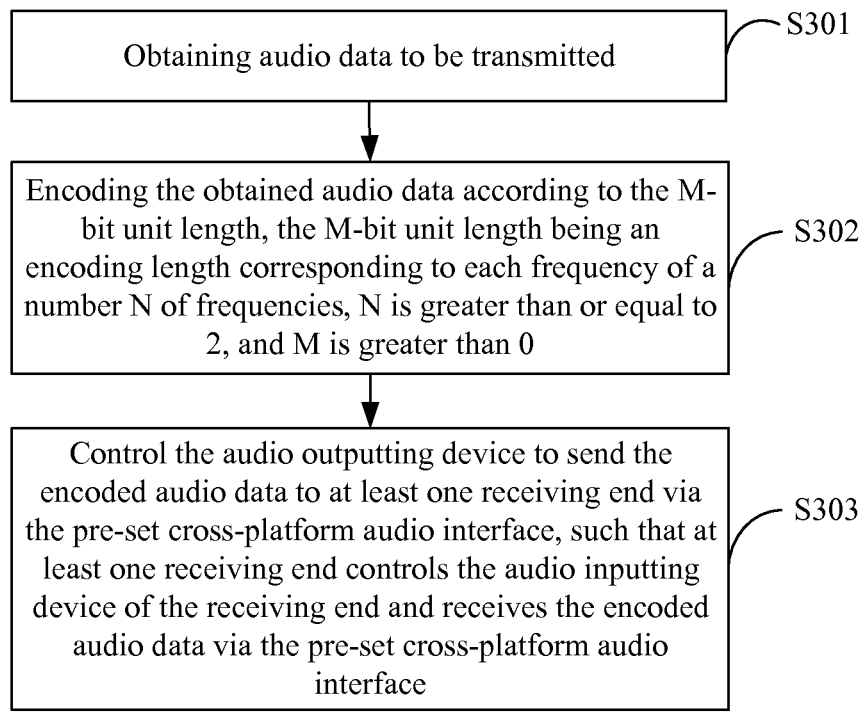
FIG. 3 is a schematic illustrating an exemplary method for transmitting information in accordance with various disclosed embodiments.

FIG. 3 depicts another exemplary method for transmitting information. The exemplary method can be implemented by a sending end 1 as shown in FIG. 1. The sending end 1 can contain an audio outputting device 11.

In Step S301, audio data to be transmitted can be obtained.

In Step S302, the sending end encodes the obtained audio data according to the M-bit unit length. The M-bit unit length is an encoding length corresponding to each frequency of a number N of frequencies, N is greater than or equal to 2, and M is greater than 0.

For example, the number N of frequencies can be selected in the transmittable audio frequency domain. Each frequency of the number N of frequencies corresponds to an M-bit encode. N is greater than or equal to 2, for example, N is 31. M is greater than 0, for example, M is 5.

A different tag can be appended respectively at a start position and an end position of the obtained audio data. The different tag includes a encode corresponding to any frequency of the number N of frequencies.

The third-party library can be used to perform an error correction to the audio data having the appended tags. The audio data after the error correction can be encoded according to the M-bit unit length. The third-party library can be a soloman library.

In Step S303, the audio outputting device is controlled to send the encoded audio data to at least one receiving end via the pre-set cross-platform audio interface, such that the at least one receiving end controls the audio inputting device of the receiving end and receives the encoded audio data via the pre-set cross-platform audio interface.

In one embodiment, the controlling of the audio outputting device to send the encoded audio data to at least one receiving end via the pre-set cross-platform audio interface includes: obtaining information of the at least one receiving end via the pre-set cross-platform audio interface; using the audio outputting device to send current, encoded audio data to the at least one receiving end, according to the obtained information of the receiving end; after finishing sending the current, encoded audio data, using the callback function of the cross-platform audio interface to detect whether new, encoded audio data exist; and when detecting that the new, encoded audio data exist, continuously using the audio outputting device of the sending end to send the new, encoded audio data; or when detecting that the new, encoded audio data do not exist, stopping sending the new, encoded audio data.

Figure 4:
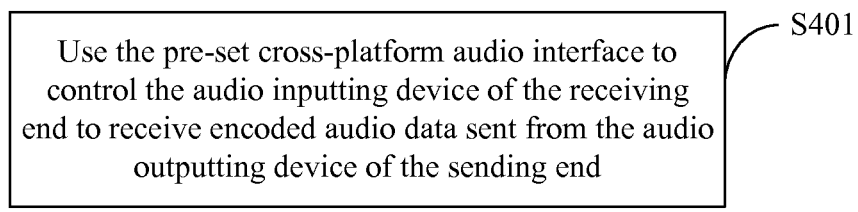
FIG. 4 is a schematic illustrating an exemplary method for transmitting information in accordance with various disclosed embodiments.

FIG. 4 depicts another exemplary method for transmitting information. The exemplary method can be implemented by a receiving end 2 as shown in FIG. 1. The receiving end 1 can contain an audio inputting device 21.

In Step S401, a pre-set cross-platform audio interface is used to control the audio inputting device of the receiving end to receive encoded audio data sent from the audio outputting device of the sending end.

In one embodiment, that the pre-set cross-platform audio interface is used to control the audio inputting device of the receiving end to receive encoded audio data sent from the audio outputting device of the sending end, includes: using the pre-set cross-platform audio interface to create the new thread; using the new thread to control the audio inputting device of the receiving end to receive the encoded audio data, wherein the encoded audio data include audio data having appended tags at the start position and the end position of the audio data; converting the received audio data into an audio signal via fast Fourier transform; restoring the audio signal to a digital signal according to a digital frequency encoding table; and/or using the third-party library to decode the digital signal and to obtain audio data to be transmitted.

Figure 5:
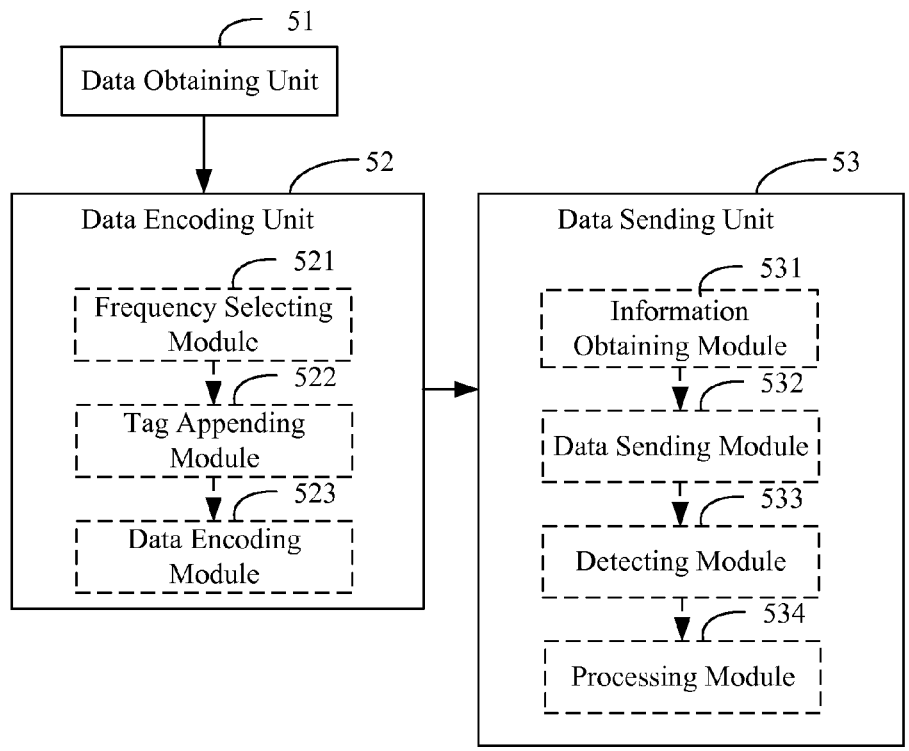
FIG. 5 is a schematic illustrating an exemplary terminal device in accordance with various disclosed embodiments.

FIG. 5 depicts an exemplary terminal device in accordance with various disclosed embodiments. The exemplary terminal can be used in the exemplary system shown in FIG. 1 and can be used as a receiving end. The exemplary terminal device can include a data obtaining unit 51, a data encoding unit 52 and/or a data sending unit 53.

The data obtaining unit 51 is configured to obtain audio data to be transmitted.

The data encoding unit 52 is configured to encode the obtained audio data by the obtaining unit 51 according to an M-bit unit length. The M-bit unit length is an encoding length corresponding to each frequency of a number N of frequencies, N is greater than or equal to 2, and M is greater than 0.

The data sending unit 53 is configured to use the pre-set cross-platform audio interface to control the audio outputting device of the sending end to send the encoded audio data to at least one receiving end, such that the at least one receiving end uses the pre-set cross-platform audio interface to control the audio inputting device at the at least one receiving end to receive the encoded audio data.

In addition, the data encoding unit 52 further includes: a frequency selecting module 521, a tag appending module 522, and/or a data encoding module 523.

The frequency selecting module 521 is configured to select the number N of frequencies in the transmittable audio frequency domain. Each frequency of the number N of frequencies corresponds to an M-bit encode.

The tag appending module 522 is configured to append a different tag respectively at a start position and an end position of the obtained audio data. The different tag can include a encode corresponding to any frequency of the number N of frequencies.

The data encoding module 523 is configured to use a third-party library to perform an error correction to the audio data having the appended tags, and to encode the audio data after error correction according to the M-bit unit length.

The data sending unit 53 includes: an information obtaining module 531, a data sending module 532, a detecting module 533, and/or a processing module 534.

The information obtaining module 531 is configured to obtain information of the at least one receiving end via the pre-set cross-platform audio interface.

The data sending module 532 is configured to use the audio outputting device to send current, encoded audio data to the at least one receiving end according to the obtained information of the at least one receiving end.

The detecting module 533 is configured, after finishing sending the current, encoded audio data, to use a callback function of the cross-platform audio interface to detect whether new, encoded audio data exist.

The processing module 534 is configured, when detecting that the new encoded audio data exist, to continuously use the audio outputting device of the sending end to send the new, encoded audio data; or when the new encoded audio data do not exist, to stop sending the new, encoded audio data.

Figure 6:
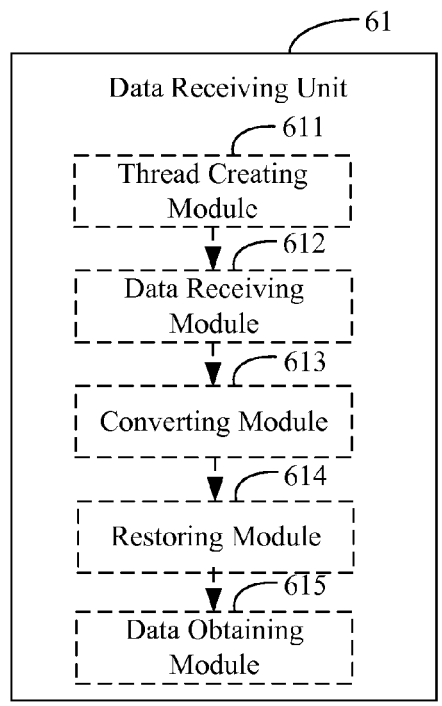
FIG. 6 is a schematic illustrating another exemplary terminal device in accordance with various disclosed embodiments.

FIG. 6 depicts an exemplary terminal device in accordance with various disclosed embodiments. The terminal device can be used in the system according to FIG. 1 and can be used as a receiving end shown in FIG. 1.

The exemplary terminal device can include a data receiving unit 61. The data receiving unit 61 is configured to use the pre-set cross-platform audio interface to control the audio inputting device of the receiving end to receive encoded audio data sent from the audio outputting device of the sending end.

The data receiving unit 61 further includes: a thread creating module 611, a data receiving module 612, a converting module 613, a restoring module 614, and/or a data obtaining module 615.

The thread creating module 611 is configured to use the pre-set cross-platform audio interface to create a new thread.

The data receiving module 612 is configured to use the new thread to control the audio inputting device of the receiving end to receive the encoded audio data. The encoded audio data include audio data having appended tags at the start position and the end position of the audio data.

The converting module 613 is configured to convert the received audio data into an audio signal via fast Fourier transform.

The restoring module 614 is configured to restore the audio signal to a digital signal according to a digital frequency encoding table.

The data obtaining module 615 is configured to use the third-party library to decode the digital signal and to obtain audio data to be transmitted.

Figure 7:
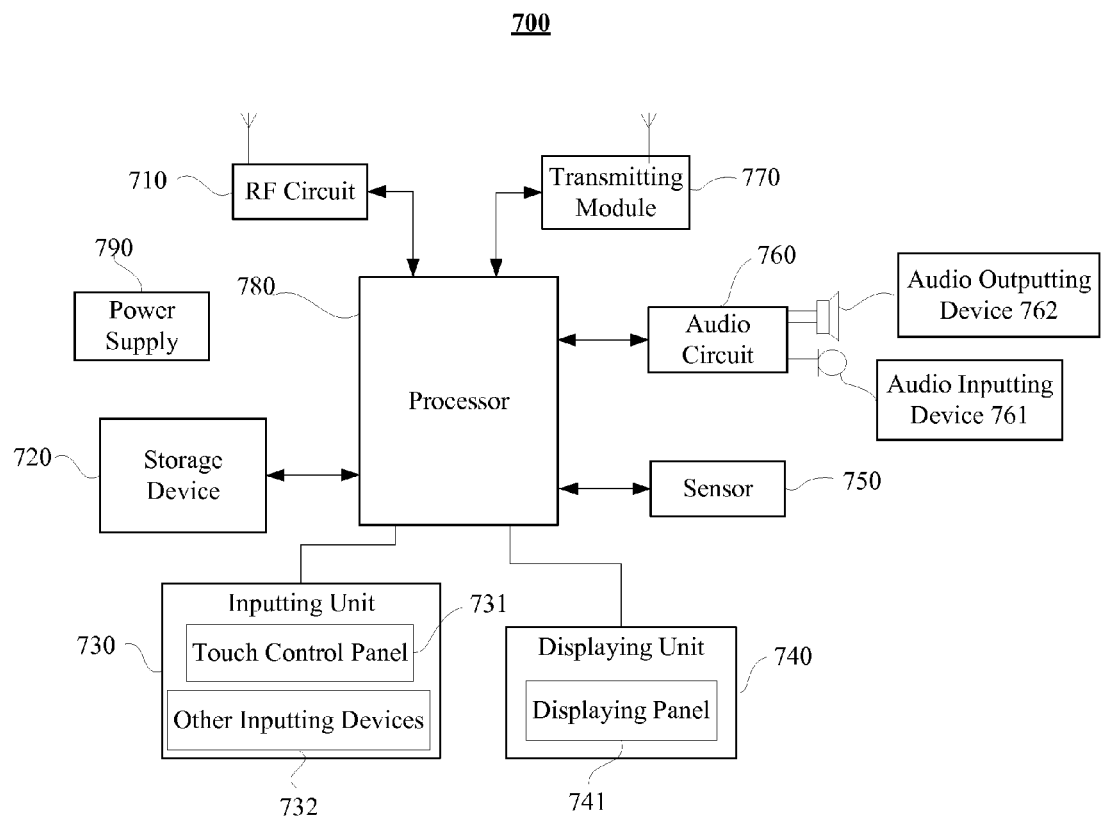
FIG. 7 is a schematic illustrating an exemplary terminal device in accordance with various disclosed embodiments.

The exemplary user terminal can include a mobile phone, a tablet computer, a PDA (personal digital assistant), a POS (point of sales), a car-carrying-computer, or any desired terminal devices. FIG. 7 depicts at least a portion of an exemplary user terminal.

As shown in FIG. 7, the exemplary terminal 700 can include an RF (Radio Frequency) circuitry 710, a storage device 720 including one or more computer-readable storage media, an inputting unit 730, a displaying unit 740, a sensor 750, an audio circuit 760, a transmitting module 770, a processor 780 including one or more processing cores, a power supply 790, and/or other components. In various embodiments, the terminal(s) described herein can include more or less components as depicted in FIG. 7. Certain parts can be omitted, combined, re-placed, and added.

The RF circuitry 710 may be used to send and receive information or send and receive signal during communication. In particular, after receiving downlink information from a base station, such information can be processed by the one or more processors 780. Further, the data related to the uplink can be sent to the base station. Generally, the RF circuitry 710 can include, but be not limited to, an antenna, at least one amplifier, a tuner, one or more oscillators, user identity module (SIM) card, a transceiver, a coupler, LNA (i.e., Low Noise Amplifier), duplexer, etc. In addition, the RF circuitry 710 may communicate with other devices via a wireless communication network. The wireless communication may use any communication standards or protocols, including but not limited to, GSM (Global System for Mobile Communications), GPRS (General Packet Radio Service), CDMA (Code Division Multiple Access), WCDMA (Wideband encode Division Multiple Access), LTE (Long Term Evolution), e-mail, SMS (Short Messaging Service), etc.

The storage device 720 can be used for storing software programs and modules, such as those software programs and modules corresponding to the terminal and the third party service provider as described in FIGS. 3-5 for business processing. By running software programs and modules stored in the storage device 720, the processor 780 can perform various functional applications and data processing to achieve business processing. The storage device 720 can include a program storage area and a data storage area. The program storage area can store the operating system, applications (such as sound playback, image playback, etc.) required by at least one function. The data storage area can store data (such as audio data, phone book, etc.) created when using the terminal. In addition, the storage device 720 may include a high-speed random access memory, a non-volatile memory, such as at least one disk memory, flash memory, and/or other volatile solid-state memory elements. Accordingly, the storage device 720 may further include a memory controller to provide the processor 780 and the inputting unit 730 with access to the storage device 720.

The inputting unit 730 can be used to receive inputted numeric or character information, and to generate signal input of keyboard, mouse, joystick, and trackball or optical signal input related to the user settings and function controls. Specifically, the inputting unit 730 may include a touch control panel 731 and other inputting device(s) 732. The touch-sensitive surface 731, also known as a touch screen or touch panel, may collect touch operations that a user conducts on or near the touch-sensitive surface 731. For example, a user may use a finger, a stylus, and any other suitable object or attachment on the touch-sensitive surface 731 or on an area near the touch-sensitive surface 731. The touch-sensitive surface 731 may drive a connecting device based on a preset program. Optionally, the touch control panel 731 may include a touch detection device and a touch controller. The touch detection device can detect user's touch position and detect a signal due to a touch operation and send the signal to the touch controller. The touch controller can receive touch information from the touch detection device, convert the touch information into contact coordinates to send to the processor 780, and receive commands sent from the processor 780 to execute. Furthermore, the touch control panel 731 can be realized by resistive, capacitive, infrared surface acoustic wave, and/or other types of surface touch. In addition to the touch control panel 731, the inputting unit 730 may also include other inputting device(s) 732. Specifically, the other inputting device(s) 732 may include, but be not limited to, a physical keyboard, function keys (such as volume control buttons, switch buttons, etc.), a trackball, a mouse, an operating lever, or combinations thereof.

The displaying unit 740 can be used to display information inputted by the user, information provided to the user, and a variety of graphical user interfaces of the terminal 700. These graphical user interfaces can be formed by images, text, icons, videos, and/or any combinations thereof. The displaying unit 740 may include a displaying panel 741 configured by, e.g., LCD (Liquid Crystal Display), OLED (Organic Light-Emitting Diode), etc. Further, the touch control panel 731 may cover the displaying panel 741. When the touch control panel 731 detects a touch operation on or near the touch sensitive surface, the touch operation can be sent to the processor 780 to determine a type of the touch operation. Accordingly, the processor 780 can provide visual output on the displaying panel 741. Although in FIG. 7 the touch-sensitive surface 731 and the displaying panel 741 are shown as two separate components to achieve input and output functions, in some embodiments, the touch control panel 731 and the displaying panel 741 can be integrated to perform input and output functions.

The terminal 700 in FIG. 7 may further include at least one sensor 750, such as optical sensors, motion sensors, and other suitable sensors. Specifically, the optical sensors may include an ambient optical sensor and a proximity sensor. The ambient optical sensor may adjust brightness of the displaying panel 741 according to the brightness of ambient light. The proximity sensor can turn off the displaying panel 741 and/or turn backlighting, when the terminal 700 moves to an ear. As a type of motion sensor, a gravity sensor may detect amount of an acceleration in each direction (e.g., including three axis) and detect magnitude and direction of gravity when in stationary. The gravity sensor can be used to identify phone posture (for example, switching between horizontal and vertical screens, related games, magnetometer calibration posture, etc.), vibration recognition related functions (e.g., pedometer, percussion, etc.), etc. The terminal 700 can also be configured with, e.g., a gyroscope, a barometer, a hygrometer, a thermometer, an infrared sensor, and/or other sensors.

The audio circuit 760 can include an audio inputting device 761 such as a microphone and an audio outputting device 762 such as a speaker and can provide an audio interface between the user and terminal 700. The audio circuit 760 may transmit an electrical signal converted from the received audio data to the speaker 761 to convert into audio signal output. On the other hand, the microphone 762 can convert the collected sound signal to an electrical signal, which can be received by the audio circuit 760 to convert into audio data. The audio data can be output to the processor 780 for processing and then use the RF circuitry 710 to transmit to, e.g., another terminal. Alternatively, the audio data can be output to the storage device 720 for further processing. The audio circuitry 760 may also include an earplug jack to provide communications between the peripheral headset and the terminal 700.

The terminal 700 may use the transmitting module 770 to help users send and receive emails, browse websites, access streaming media, etc. The transmitting module 770 can provide users with a wireless or wired broadband Internet access. In various embodiments, the transport module 770 can be configured within or outside of the terminal 700 as depicted in FIG. 7.

The processor 780 can be a control center of the terminal 700: using a variety of interfaces and circuits to connect various parts, e.g., throughout a mobile phone; running or executing software programs and/or modules stored in the storage device 720; calling the stored data in the storage device 720; and/or performing various functions and data processing of the terminal 700 to monitor the overall mobile phone. Optionally, the processor 780 may include one or more processing cores. In an exemplary embodiment, the processor 780 may integrate application processor with modulation and demodulation processor. The application processor is mainly used to process operating system, user interface, and applications. The modulation and demodulation processor is mainly used to deal with wireless communications. In various embodiments, the modulation and demodulation processor may or may not be integrated into the processor 780.

The terminal 700 may further include a power supply 790 (such as a battery) to power various components of the terminal. In an exemplary embodiment, the power supply can be connected to the processor 780 via the power management system, and thus use the power management system to manage charging, discharging, and/or power management functions. The power supply 790 may also include one or more DC or AC power supplies, a recharging system, a power failure detection circuit, a power converter or inverter, a power status indicator and/or any other suitable components.

Although not shown in FIG. 7, the terminal 700 can further include a camera, a Bluetooth module, etc. without limitation. Specifically, the terminal can have a displaying unit of a touch screen display, a memory, and one or more programs stored in the memory. The terminal can be configured to use one or more processor to execute the one or more programs stored in the memory.

For example, the processor 780 can at least be configured to obtain audio data to be transmitted; to encode the obtained audio data according to the M-bit unit length. The M-bit unit length is an encoding length corresponding to each frequency of a number N of frequencies, N is greater than or equal to 2, and M is greater than 0.

For example, the processor 780 can be configured to use the pre-set cross-platform audio interface to control the audio outputting device of the sending end to send the encoded audio data to other one or more terminal devices, such that the other one or more terminal devices use the pre-set cross-platform audio interface to control the audio inputting device of the receiving end to receive the encoded audio data.

In addition, when encoding the obtained audio data according to the M-bit unit length, the processor 780 of the terminal device can be configured to select the number N of frequencies in a transmittable audio frequency domain. Each frequency of the number N of frequencies corresponds to an M-bit encode, N is greater than or equal to 2, and M is greater than 0. The processor 780 of the terminal device can also be configured to append a different tag respectively at a start position and an end position of the obtained audio data. The different tag can include the encode corresponding to any frequency of the number N of frequencies. The processor 780 of the terminal device can further be configured to use the third-party library to perform the error correction to the audio data having the appended tags, and to encode the audio data after the error correction according to the M-bit unit length.

Further, when controlling the audio outputting device 761 of the sending end and sending the encoded audio data to other terminal devices, the processor 780 of the terminal device can be configured to obtain information of other terminal devices via the pre-set cross-platform audio interface; to use the audio outputting device 761 to send current, encoded audio data to the other terminal devices, according to the obtained information of the other terminal devices; and/or to use the callback function of the cross-platform audio interface to detect whether new, encoded audio data exist after finishing sending the current, encoded audio data. When detecting that the new, encoded audio data exist, the processor 780 of the terminal device can be configured to continuously use the audio outputting device 761 to send the new, encoded audio data. When the new, encoded audio data do not exist, the processor 780 of the terminal device can be configured to stop sending the new, encoded audio data.

In addition, when controlling the audio inputting device 762 of the receiving end to receive the encoded audio data via the pre-set cross-platform audio interface, the processor 780 of the terminal device can further be configured to use the pre-set cross-platform audio interface to create a new thread; to use the new thread to control the audio inputting device 762 to receive the encoded audio data, the encoded audio data including the audio data having the appended tags at the start position and the end position; to convert the received audio data into an audio signal via fast Fourier transform; to restore the audio signal to a digital signal according to a digital frequency encoding table; and/or to use the third-party library to decode the digital signal and to obtain the audio data to be transmitted.

In this manner, the disclosed information transmission can only use audio outputting devices (e.g., a speaker) already-equipped in a sending unit and audio inputting devices (e.g., microphone) already-equipped in a receiving unit to achieve information transmission via an encoding mode. There is no need for additional hardware devices. Further, during the information transmission, there is no need to match or pair the two transmitting parties before the transmission. Moreover, the sending (or transmitting) end can send information simultaneously to one or more receiving ends to improve transmission efficiency.

It should be noted that, in the present disclosure each embodiment is progressively described, i.e., each embodiment is described and focused on difference between embodiments. Similar and/or the same portions between various embodiments can be referred to with each other. In addition, exemplary apparatus is described with respect to corresponding methods.

Note that, the term "comprising", "including" or any other variants thereof are intended to cover a non-exclusive inclusion, such that the process, method, article, or apparatus containing a number of elements also include not only those elements, but also other elements that are not expressly listed; or further include inherent elements of the process, method, article or apparatus. Without further restrictions, the statement "includes a" does not exclude other elements included in the process, method, article, or apparatus having those elements.

A person of ordinary skill in the art can understand that the modules included herein are described according to their functional logic, but are not limited to the above descriptions as long as the modules can implement corresponding functions. Further, the specific name of each functional module is used for distinguishing from on another without limiting the protection scope of the present disclosure.

In various embodiments, the disclosed modules can be configured in one apparatus or configured in multiple apparatus as desired. The modules disclosed herein can be integrated in one module or in multiple modules. Each of the modules disclosed herein can be divided into one or more sub-modules, which can be recombined in any manner.

One of ordinary skill in the art would appreciate that suitable software and/or hardware (e.g., a universal hardware platform) may be included and used in the disclosed methods and systems. For example, the disclosed embodiments can be implemented by hardware only, which alternatively can be implemented by software products only. The software products can be stored in a computer-readable storage medium (e.g., as shown in FIG. 14) including, e.g., ROM/RAM, magnetic disk, optical disk, etc. The software products can include suitable commands to enable a terminal device (e.g., including a mobile phone, a personal computer, or a network device, etc.) to implement the disclosed embodiments.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Methods, systems, and terminal devices for transmitting information are provided. An exemplary system includes a sending end and at least one receiving end. The sending end is configured to obtain audio data to be transmitted, encode the obtained audio data according to an M-bit unit length, and use a pre-set cross-platform audio interface to control an audio outputting device of the sending end to send the encoded audio data to the at least one receiving end. The M-bit unit length is an encoding length corresponding to each frequency of a number N of frequencies, N is greater than or equal to 2, and M is greater than 0. The at least one receiving end is configured to use the pre-set cross-platform audio interface to control an audio inputting device of the at least one receiving end to receive the encoded audio data.

As disclosed, a cross-platform audio interface can be configured and can be used to block/remove differences among information transmitting platforms of various terminal devices. Unitive standards can be used to realize information transmitting between different terminal devices.

The disclosed methods, systems, and terminal devices for transmitting information can only use audio outputting devices (e.g., a speaker) already-equipped in a sending unit and audio inputting devices (e.g., microphone) already-equipped in a receiving unit to achieve information transmission via an encoding mode. There is no need for additional hardware devices. Further, during information transmission, there is no need to match or pair transmitting parties before the transmission. Moreover, the sending (or transmitting) end can send information simultaneously to one or more receiving ends to improve transmission efficiency.

What is claimed is:

1. An information transmitting method implemented by a system including a sending end and at least one receiving end, comprising:

obtaining, by the sending end, audio data to be transmitted;

coding, by the sending end, the obtained audio data according to an M-bit unit length, wherein the M-bit unit length is an encoding length corresponding to each frequency of a number N of frequencies, the N frequencies being in a transmittable audio frequency range, N is greater than or equal to 2, and M is greater than 0;

using, by the sending end, a pre-set cross-platform audio interface to control an audio outputting device of the sending end to send the encoded audio data to the at least one receiving end, the audio outputting device being a speaker; and using, by the at least one receiving end, the pre-set cross-platform audio interface to control an audio inputting device of the at least one receiving end to receive the encoded audio data, the audio inputting device being a microphone;

wherein the sending end sends the encoded audio data to the at least one receiving end via acoustic communication.

2. The method according to claim 1, wherein encoding the obtained audio data according to the M-bit unit length includes:

selecting the number N of frequencies in the transmittable audio frequency range, wherein each frequency of the number N of frequencies corresponds to an M-bit encode;

appending respectively, a first tag at a start position of the obtained audio data and a second tag at an end position of the obtained audio data, wherein the first tag includes an encode corresponding to a first frequency of the number N of frequencies, and the second tag includes an encode corresponding to a second frequency of the number N of frequencies; and using a third-party library to perform an error correction to the audio data having the appended tags, and encoding the audio data after the error correction according to the M-bit unit length.

3. The method according to claim 1, wherein controlling the audio outputting device and sending the encoded audio data includes:

obtaining information of the at least one receiving end via the pre-set cross-platform audio interface by the sending end;

using the audio outputting device of the sending end to send current, encoded audio data to the at least one receiving end, according to the obtained information of the at least one receiving end;

after finishing sending the current, encoded audio data, using a callback function of the cross-platform audio interface to detect whether new, encoded audio data exist; and when detecting that the new, encoded audio data exist, continuously using the audio outputting device of the sending end to send the new, encoded audio data; or when the new, encoded audio data do not exist, stopping sending the new, encoded audio data.

4. The method according to claim 1, wherein controlling the audio inputting device of the receiving end to receive the encoded audio data via the pre-set cross-platform audio interface by the at least one receiving end includes:

using the pre-set cross-platform audio interface to create a new thread by the at least one receiving end;

using the new thread to control the audio inputting device of the receiving end to receive the encoded audio data, wherein the encoded audio data include the audio data having the appended tags at the start position and the end position;

converting the received audio data into an audio signal via fast Fourier transform;

restoring the audio signal to a digital signal according to a digital frequency encoding table; and using the third-party library to decode the digital signal and to obtain the audio data to be transmitted.

5. An information transmitting method, comprising:

obtaining audio data to be transmitted by a sending end containing an audio outputting device, the audio outputting device being a speaker;

coding the obtained audio data according to an M-bit unit length, wherein the M-bit unit length is an encoding length corresponding to each frequency of a number N of frequencies, the N frequencies being in a transmittable audio frequency range, wherein N is greater than or equal to 2, and M is greater than 0; and using a pre-set cross-platform audio interface to control the audio outputting device of the sending end to send the encoded audio data to at least one receiving end, such that the at least one receiving end uses the pre-set cross-platform audio interface to control an audio inputting device at the at least one receiving end to receive the encoded audio data, the audio inputting device being a microphone;

wherein the sending end sends the encoded audio data to the at least one receiving end via acoustic communication.

6. The method according to claim 5, wherein encoding the obtained audio data according to the M-bit unit length includes:

selecting the number N of frequencies in the transmittable audio frequency range, wherein each frequency of the number N of frequencies corresponds to an M-bit encode;

appending respectively, a first tag at a start position of the obtained audio data and a second tag at an end position of the obtained audio data, wherein the first tag includes an encode corresponding to a first frequency of the number N of frequencies, and the second tag includes an encode corresponding to a second frequency of the number N of frequencies; and using a third-party library to perform an error correction to the audio data having the appended tags, and encoding the audio data after error correction according to the M-bit unit length.

7. The method according to claim 5, wherein controlling the audio outputting device and sending the encoded audio data includes:

obtaining information of the at least one receiving end via the pre-set cross-platform audio interface;

using the audio outputting device to send current, encoded audio data to the at least one receiving end according to the obtained information of the at least one receiving end;

after finishing sending the current, encoded audio data, using a callback function of the cross-platform audio interface to detect whether new, encoded audio data exist; and when detecting that the new encoded audio data exist, continuously using the audio outputting device of the sending end to send the new, encoded audio data; or when the new encoded audio data do not exist, stopping sending the new, encoded audio data.

8. The method according to claim 5, the sending end being connected to a receiving end containing an audio inputting device, the method further comprising:
using a pre-set cross-platform audio interface to control the audio inputting device of the receiving end to receive encoded audio data sent from the sending end by a process comprising:
using the pre-set cross-platform audio interface to create a new thread;
using the new thread to control the audio inputting device of the receiving end to receive the encoded audio data, wherein the encoded audio data include audio data having appended tags at a start position and an end position of the audio data;
converting the received audio data into an audio signal via fast Fourier transform;
restoring the audio signal to a digital signal according to a digital frequency encoding table; and
using the third-party library to decode the digital signal and to obtain audio data to be transmitted.

9. The method according to claim 1, wherein:
the audio outputting device is within a sound collecting range of the audio inputting device.

10. The method according to claim 1, wherein M and N are integers, and N is smaller or equal to $2^m$.

11. The method according to claim 1, wherein:
the obtained audio data to be transmitted includes audio data converted from text messages at the sending end.

12. An information transmitting system comprising:
a sending end and at least one receiving end, the sending end containing an audio outputting device and the at least one receiving end containing an audio inputting device, the audio outputting device being a speaker and the audio inputting device being a microphone, wherein:
the sending end is configured to obtain audio data to be transmitted, to encode the obtained audio data according to an M-bit unit length, and to use a pre-set cross-platform audio interface to control the audio outputting device to send the encoded audio data to the at least one receiving end, wherein the M-bit unit length is an encoding length corresponding to each frequency of a number N of frequencies, the N frequencies being in a transmittable audio frequency range, N is greater than or equal to 2, and M is greater than 0; and
the at least one receiving end is configured to use the pre-set cross-platform audio interface to control the audio inputting device of the at least one receiving end to receive the encoded audio data;
wherein the sending end sends the encoded audio data to the at least one receiving end via acoustic communication.

13. The system according to claim 12, wherein the sending end is configured to:
select the number N of frequencies in the transmittable audio frequency range, wherein each frequency of the number N of frequencies corresponds to an M-bit encode;
append respectively, a first tag at a start position of the obtained audio data and a second tag at an end position of the obtained audio data, wherein the first tag includes an encode corresponding to a first frequency of the number N of frequencies, and the second tag includes an encode corresponding to a second frequency of the number N of frequencies; and
use a third-party library to perform an error correction to the audio data having the appended tags, and to encode the audio data after the error correction according to the M-bit unit length.

14. The system according to claim 12, wherein the sending end is configured to:
use the pre-set cross-platform audio interface to obtain information of the at least one receiving end;
use the audio outputting device of the sending end to send current, encoded audio data to the at least one receiving end, according to the obtained information of the at least one receiving end;
after finishing sending the current, encoded audio data, use a callback function of the cross-platform audio interface to detect whether new, encoded audio data exist; and
when detecting that a new, encoded audio data exist, continuously use the audio outputting device of the sending end to send the new, encoded audio data; or
when the new, encoded audio data do not exist, stop sending the new, encoded audio data.

15. The system according to claim 12, wherein the at least one receiving end is configured to:
use the pre-set cross-platform audio interface to create a new thread;
use the new thread to control the audio inputting device of the receiving end to receive the encoded audio data, wherein the encoded audio data include the audio data having the appended tags at the start position and the end position;
convert the received audio data into an audio signal via fast Fourier transform;
restore the audio signal to a digital signal according to a digital frequency encoding schedule; and
use the third-party library to decode the digital signal and to obtain the audio data to be transmitted.

16. A terminal device containing an audio outputting device comprising:
a data obtaining unit configured to obtain audio data to be transmitted;
a data encoding unit configured to encode the obtained audio data according to an M-bit unit length, wherein the M-bit unit length is an encoding length corresponding to each frequency of a number N of frequencies, the N frequencies being in a transmittable audio frequency range, N is greater than or equal to 2, and M is greater than 0; and
a data sending unit configured to use a pre-set cross-platform audio interface to control the audio outputting device of the sending end to send the encoded audio data to at least one receiving end, such that the at least one receiving end uses the pre-set cross-platform audio interface to control the audio inputting device at the at least one receiving end to receive the encoded audio data, the audio outputting device being a speaker and the audio inputting device being a microphone;
wherein the sending end sends the encoded audio data to the at least one receiving end via acoustic communication.

17. The terminal device according to claim 16, wherein the data encoding unit includes:
a frequency selecting module configured to select the number N of frequencies in the transmittable audio frequency range, wherein each frequency of the number N of frequencies corresponds to an M-bit encode;
a tag appending module configured to append respectively, a first tag at a start position of the obtained audio data and a second tag at an end position of the obtained audio data, wherein the first tag includes an encode corresponding to a first frequency of the number N of frequencies, and the second tag includes an encode corresponding to a second frequency of the number N of frequencies; and a data encoding module configured to use a third-party library to perform an error correction to the audio data having the appended tags, and encoding the audio data after error correction according to the M-bit unit length.

18. The terminal device according to claim 16, wherein the data sending unit includes:

an information obtaining module configured to obtain information of the at least one receiving end via the pre-set cross-platform audio interface;

a data sending module configured to use the audio outputting device to send current, encoded audio data to the at least one receiving end according to the obtained information of the at least one receiving end;

a detecting module configured, after finishing sending the current, encoded audio data, to use a callback function of the cross-platform audio interface to detect whether new, encoded audio data exist; and a processing module configured, when detecting that the new encoded audio data exist, to continuously use the audio outputting device of the sending end to send the new, encoded audio data; or when the new encoded audio data do not exist, to stop sending the new, encoded audio data.

19. The terminal device according to claim 16, further comprising:

an audio inputting device; and a data receiving unit configured to use a pre-set cross-platform audio interface to control the audio inputting device of the receiving end to receive encoded audio data sent from the audio outputting device of the sending end.

20. The terminal device according to claim 19, wherein the data receiving unit includes:

a thread creating module configured to use the pre-set cross-platform audio interface to create a new thread;

a data receiving module configured to use the new thread to control the audio inputting device of the receiving end to receive the encoded audio data, wherein the encoded audio data include audio data having appended tags at a start position and an end position of the audio data;

a converting module configured to convert the received audio data into an audio signal via fast Fourier transform;

a restoring module configured to restore the audio signal to a digital signal according to a digital frequency encoding table; and a data obtaining module configured to use the third-party library to decode the digital signal and to obtain audio data to be transmitted.

* * * * *